United States Patent
Sun et al.

(10) Patent No.: US 8,888,338 B2
(45) Date of Patent: Nov. 18, 2014

(54) REFLECTIVE STREET LIGHT WITH WIDE DIVERGENCE ANGLE

(71) Applicants: Ching-Cherng Sun, Taoyuan County (TW); Yi-Chien Lo, Miaoli County (TW); Shih-Kai Lin, Tainan (TW)

(72) Inventors: Ching-Cherng Sun, Taoyuan County (TW); Yi-Chien Lo, Miaoli County (TW); Shih-Kai Lin, Tainan (TW)

(73) Assignee: National Central University, Zhongli, Taoyuan County (TW)

( * ) Notice: Subject to any disclaimer, the term of this patent is extended or adjusted under 35 U.S.C. 154(b) by 68 days.

(21) Appl. No.: 13/794,163

(22) Filed: Mar. 11, 2013

(65) Prior Publication Data
US 2013/0194810 A1   Aug. 1, 2013

Related U.S. Application Data

(63) Continuation-in-part of application No. 13/222,896, filed on Aug. 31, 2011, now abandoned.

(51) Int. Cl.
| | |
|---|---|
| F21S 8/00 | (2006.01) |
| F21V 13/04 | (2006.01) |
| F21S 8/08 | (2006.01) |
| F21V 5/04 | (2006.01) |
| F21V 7/00 | (2006.01) |
| F21W 131/103 | (2006.01) |

(52) U.S. Cl.
CPC ........... *F21V 13/04* (2013.01); *F21S 8/086* (2013.01); *F21V 5/04* (2013.01); *F21V 7/0091* (2013.01); *Y02B 20/72* (2013.01); *F21W 2131/103* (2013.01)
USPC ....... 362/431; 362/555; 362/311.02; 362/328

(58) Field of Classification Search
USPC ............ 362/310, 327, 311.02, 555, 308, 328, 362/431
See application file for complete search history.

(56) References Cited

U.S. PATENT DOCUMENTS

| | | | | |
|---|---|---|---|---|
| 7,438,445 | B2* | 10/2008 | Shiau et al. | 362/333 |
| 7,549,781 | B2* | 6/2009 | Kim et al. | 362/555 |
| 8,070,326 | B2* | 12/2011 | Lee | 362/307 |
| 8,142,056 | B2* | 3/2012 | Li | 362/326 |
| 8,613,531 | B2* | 12/2013 | Mochizuki | 362/308 |
| 8,696,175 | B2* | 4/2014 | Yoon et al. | 362/335 |

* cited by examiner

Primary Examiner — Peggy Neils
(74) Attorney, Agent, or Firm — Shimokaji & Associates P.C.

(57) ABSTRACT

A reflective street light with wide divergence angle includes a light device having a light emitter and a total reflection lens. The light rays from the light emitter are reflected to two sides of the total reflection lens and then are refracted outwardly via the refraction surfaces at a maximum angle.

2 Claims, 3 Drawing Sheets

REFLECTIVE STREET LIGHT WITH WIDE DIVERGENCE ANGLE

CROSS-REFERENCE

The present application is a continuation-in-part (CIP) application of a pending U.S. application Ser. No. 13/222,896, entitled "REFLECTIVE STREET LIGHT WITH WIDE DIVERGENCE ANGLE", and filed on Aug. 31, 2011, which is incorporated herein by reference in its entirety.

BACKGROUND OF THE INVENTION

1. Field of the Invention

The present invention relates to a reflective street light, and more particularly to a reflective street light with wide divergence angle.

2. Description of Related Art

A conventional reflective street light includes an installation portion and a reflection portion. The installation portion is connected with a light emitter and the reflection portion has a film coated thereon so as to reflect the light. When the light emitter is activated by current and emits multiple light rays, the reflection portion reflects the light rays toward the same direction so that the light rays directly light or are reflected to the area to be lighted.

However, the conventional reflective street light can only reflect the light rays downwardly so that the emitting range of the light emitter is limited. Therefore, the conventional reflective street light is not able to illuminate in a wide divergence angle Thereby, the present invention has arisen to mitigate and/or obviate the disadvantages of the conventional reflective street light. The present invention provides a reflective street light with wide divergence angle, wherein the light rays are reflected to two sides of a lens and then refracted outwardly at a maximum angle.

SUMMARY OF THE INVENTION

The main objective of the present invention is to provide a wide divergence angle total reflection street light includes a light device having a light emitter and a total reflection lens. The light rays from the light emitter are reflected to two sides of the total reflection lens and then are refracted outward via the refraction surfaces at maximum angle.

To achieve the objective, a reflective street light with wide divergence angle comprises a light device having a light emitter and a total reflection lens, the total reflection lens having a recess defined at a first side thereof and the light emitter located in the recess, the recess being moderate-sized and formed as semicircular shaped so as to fit a size of the light emitter and correspond to a shape of the light emitter, the total reflection lens having two refraction surfaces respectively located on two sides thereof, the two refraction surfaces being smooth, each refraction surface gradually inclined toward a center portion of the light device from a bottom end to a top end thereof, the top end of each refraction surface being horizontally closer to the center portion of the light device than the bottom end of each refraction surface, a V-shaped and recessed reflection surface defined at a second side of the total reflection lens, a bottom of the V-shaped reflection surface facing toward a top of the recess, the reflection surface reflecting light rays from the light emitter to the refraction surfaces so that the light rays are refracted outwardly to outer sides of the light device via the refraction surfaces. Wherein, the light device of the present invention is formed approximately as dumbbell shaped; a neck portion is defined around the center portion of the light device, a longitudinal sectional area of the neck portion is the smallest longitudinal sectional area among longitudinal sectional areas of the light device.

Under this arrangement, parts of the light rays from the light emitter are directly refracted via the refraction surfaces; and rests of the light rays are emitted to the reflection surface firstly; then, rests of the light rays are reflected to the refraction surfaces via the reflection surface; lastly, rests of the light rays are refracted outwardly so as to reinforce the illumination on sides of the light emitter.

Further benefits and advantages of the present invention will become apparent after a careful reading of the detailed description with appropriate reference to the accompanying drawings.

DETAILED DESCRIPTION OF THE INVENTION

Figure 1:
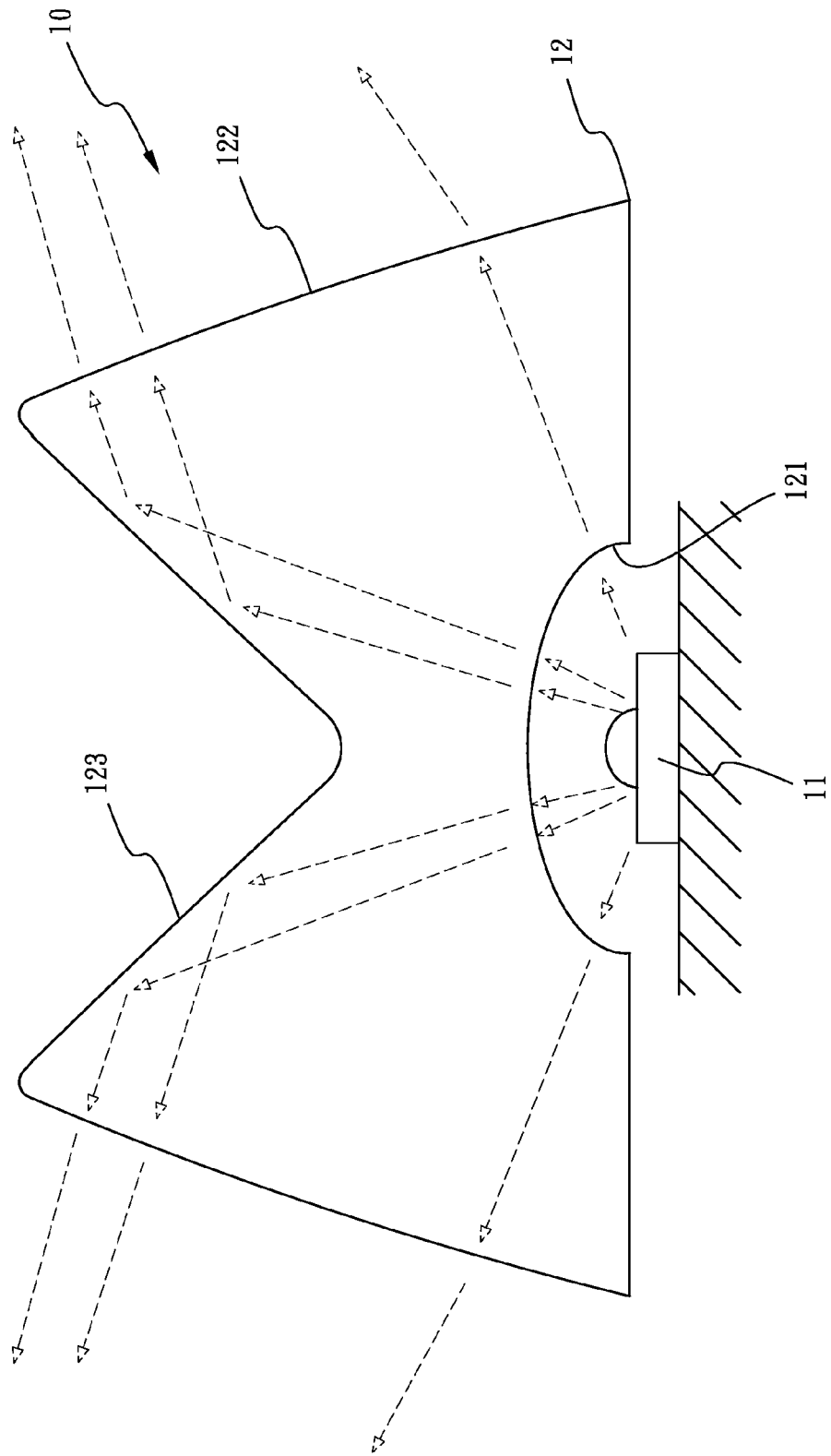
FIG. 1 shows the light traces of the light emitter and the total reflection lens of a reflective street light with wide divergence angle of the present invention.
Figure 2:
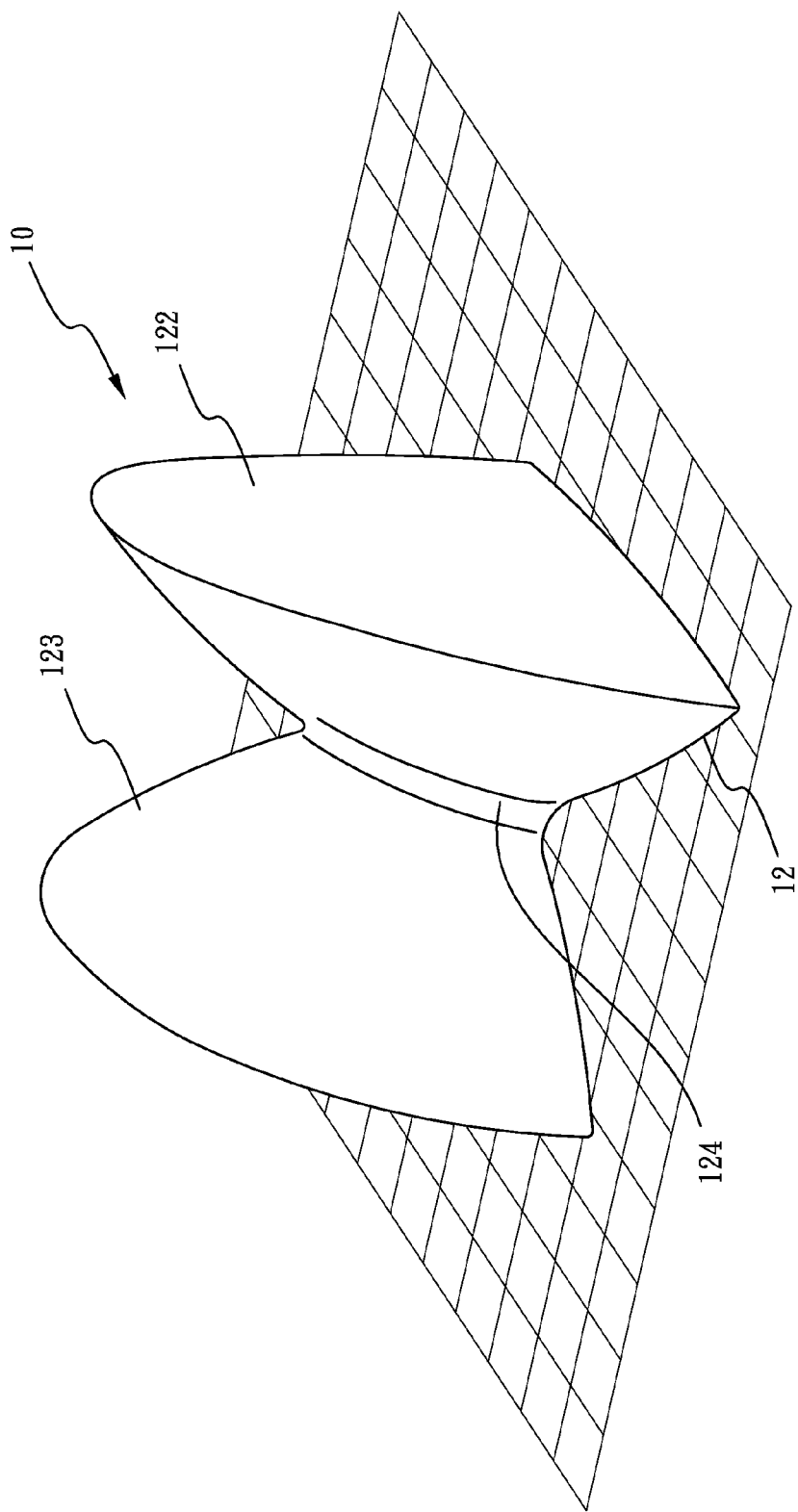
FIG. 2 shows the total reflection lens of the reflective street light with wide divergence angle of the present invention.

Referring to FIGS. 1 and 2, a reflective street light with wide divergence angle in accordance with the present invention comprises a light device 10 having a light emitter 11 and a total reflection lens 12.

The total reflection lens 12 has a recess 121 defined at the first side thereof and the light emitter 11 is located in the recess 121. The recess 121 is moderate-sized and formed as semicircular shaped so as to fit a size of the light emitter 11 and correspond to a shape of the light emitter 11. The total reflection lens 12 has two refraction surfaces 122 respectively located on two sides thereof. The two refraction surfaces 122 are smooth. Each refraction surface 122 is gradually inclined toward a center portion of the light device 10 from a bottom end to a top end thereof; that is, the top end of each refraction surface 122 is horizontally closer to the center portion of the light device 10 than the bottom end of each refraction surface 122. A V-shaped reflection surface 123 is defined at the second side of the total reflection lens 12. A bottom of the V-shaped reflection surface 123 faces toward a top of the recess 121. In a preferred embodiment, the bottom of the V-shaped reflection surface 123 faces a center of the top of the recess 121. The reflection surface 123 reflects the light rays from the light emitter 11 to the refraction surfaces 122 so that the light rays are refracted outwardly to outer sides of the light device 10 via the refraction surfaces 122.

Under this arrangement, parts of the light rays from the light emitter 11 are directly refracted via the refraction surfaces 122. Rests of the light rays are emitted to the reflection surface 123 firstly; then, rests of the light rays are reflected to the refraction surfaces 122 via the reflection surface 123; lastly, rests of the light rays are refracted outwardly so as to reinforce the illumination on sides of the light emitter 11.

Referring to FIG. 2, the present invention further has a neck portion 124 defined around the center portion of the light device 10. A longitudinal sectional area of the neck portion 124 is the smallest longitudinal sectional area among longitudinal sectional areas of the light device 10. In addition, the light device 10 of the present invention is formed approximately as dumbbell shaped.

Figure 3:
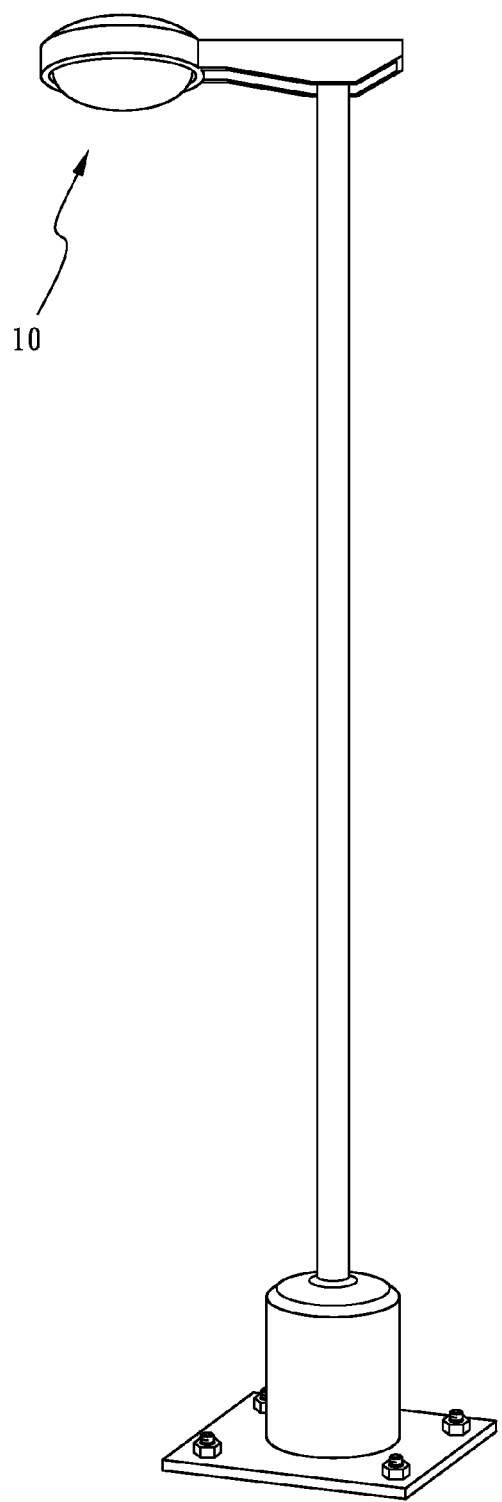
FIG. 3 shows the reflective street light with wide divergence angle of the present invention.

Referring to FIG. 3, the reflective street light with wide divergence angle of the present invention is applied to a street light, because the side illumination of the street light is expected by a higher standard, the reflective street light with wide divergence angle of the present invention illuminates the sides of the street light with the wide divergence angle so as to provide enough illumination for drivers or pedestrians.

The characteristics and the advantages of the present invention are described as following.

Firstly, the recess 121 allows every light ray quickly and efficiently entering the total reflection lens 12 because of said fit size. Besides, since the recess 121 is formed as semicircular shaped, the recess 121 makes the light rays from the light emitter 11 distribute evenly when entering the total reflection lens 12 so as to prevent the formation of the stray light.

Secondly, the two refraction surfaces 122 are smooth. Therefore, rests of the light rays are refracted to the sides of the light emitter 11 and no stray light is formed. Besides, since the top end of each refraction surface 122 is inclined toward the center portion of the light device 10, transverse sectional areas of the total reflection lens 12 gradually expand from the top end of each refraction surface 122 to the bottom end of each refraction surface 122. Therefore, the light rays are mostly accumulated around the bottom end of each refraction surface 122 so as to reinforce the illumination on the sides of the light emitter 11.

Thirdly, the V-shaped reflection surface 123 directs rests of the light rays reflecting to the two refraction surfaces 122, so that the light rays are mostly refracted outwardly toward the outer sides of the light device 10 via the refraction surfaces 122. Therefore, the present invention efficiently refracts the light rays from the light emitter 11 because of the V-shaped reflection surface 123.

Fourthly, the neck portion 124 surrounds the recess 121, so that a distance from the bottom of the V-shaped reflection surface 123 to the top of the recess 121 is short. Therefore, the light rays from the light emitter 11 are quickly refracted to the V-shaped reflection surface 123 so as to efficiently illuminate the sides of the light emitter 11 with the wide divergence angle.

Although the invention has been explained in relation to its preferred embodiment, it is to be understood that many other possible modifications and variations can be made without departing from the spirit and scope of the invention as hereinafter claimed.

What is claimed is:

1. A reflective street light with wide divergence angle comprising:

a light device having a light emitter and a total reflection lens, the total reflection lens having a recess defined at a first side thereof and the light emitter located in the recess, the recess being moderate-sized and formed as semicircular shaped so as to fit a size of the light emitter and correspond to a shape of the light emitter, the total reflection lens having two refraction surfaces respectively located on two sides thereof, the two refraction surfaces being smooth, each refraction surface gradually inclined toward a center portion of the light device from a bottom end to a top end thereof, the top end of each refraction surface being horizontally closer to the center portion of the light device than the bottom end of each refraction surface, a V-shaped and recessed reflection surface defined at a second side of the total reflection lens, a bottom of the V-shaped reflection surface facing toward a top of the recess, the reflection surface reflecting light rays from the light emitter to the refraction surfaces so that the light rays are refracted outwardly to outer sides of the light device via the refraction surfaces;

wherein parts of the light rays from the light emitter are directly refracted via the refraction surfaces; and the rest of the light rays are emitted to the reflection surface first, and then reflected to the refraction surfaces via the reflection surface, and finally refracted outwardly so as to reinforce the illumination on sides of the light emitter; and wherein the light device of the present invention is formed approximately as dumbbell shaped.

2. The reflective street light with wide divergence angle as claimed in claim 1, wherein the present invention further has a neck portion defined around the center portion of the light device; a longitudinal sectional area of the neck portion is the smallest longitudinal sectional area among longitudinal sectional areas of the light device.

* * * * *